United States Patent [19]
Newberg et al.

[11] Patent Number: 5,353,033
[45] Date of Patent: Oct. 4, 1994

[54] OPTOELECTRONIC PHASED ARRAY WITH DIGITAL TRANSMIT SIGNAL INTERFACE

[75] Inventors: Irwin L. Newberg, Northridge; Joseph P. Smalanskas, Westchester; Ronald I. Wolfson, Los Angeles; John J. Wooldridge, Manhattan Beach; Howard S. Nussbaum, Los Angeles, all of Calif.

[73] Assignee: Hughes Aircraft Company, Los Angeles, Calif.

[21] Appl. No.: 48,633

[22] Filed: Apr. 15, 1993

[51] Int. Cl.5 .............................................. H01Q 3/22
[52] U.S. Cl. .................................. 342/375; 342/154; 342/157
[58] Field of Search ................ 342/375, 372, 157, 154

[56] References Cited
U.S. PATENT DOCUMENTS 5,051,754  9/1991  Newberg ............................ 342/375
5,231,405  7/1993  Riza .................................. 342/375

Primary Examiner—Theodore M. Blum
Attorney, Agent, or Firm—L. A. Alkov; W. K. Denson-Low

[57] ABSTRACT

A true time delay phased array is provided which includes a digital subarray interface in the transmit signal path. The digital transmit signal path interface includes a digital reference signal generation means and digital signal propagation means for supplying the digital reference signal to the subarray. Each subarray includes RF carrier signal generating means for generating an RF carrier signal phase coherent with the reference signal, a fiber optic true time delay circuit for applying an appropriate phase delay to the RF carrier and an appropriate true time delay to the modulation signal, and a waveform modulator for modulating the modulating signal onto the phase locked RF carrier signal to provide the transmit signal for the subarray. The present invention can be used in conjunction with existing digital interface technology for receive and control signal paths to provide an entirely digital subarray signal path interface.

14 Claims, 2 Drawing Sheets

OPTOELECTRONIC PHASED ARRAY WITH DIGITAL TRANSMIT SIGNAL INTERFACE

BACKGROUND OF THE INVENTION

1. Field of the Invention

The present invention relates generally to beamsteered phased array antennas. More particularly, the present invention relates to an optoelectronic wide bandwidth photonically beamsteered phased array which utilizes a digital subarray interface in both the transmit and receive signal paths.

2. Description of Related Art

A beamsteered phased array is an antenna system comprising individual antenna elements in which the relative phases of the signals respectively radiated or received by the antenna elements control the effective beam pointing direction. The relative phases of the signals radiated by the individual antenna elements define the transmit beam, while the relative phases of the signals received by the individual elements define the receive beam. The beamsteering effect is substantially the same as that produced in a mechanical scan antenna by physically repositioning the antenna elements.

In a true time delay beamsteered phased array, known time delays introduced into the transmitted or received signals control the relative phase between individual elements and thereby the antenna beam pointing direction. U.S. Pat. No. 5,051,754 discloses a true time delay phased array utilizing a photonic true time delay circuit for both the transmit and receive signal paths. A plurality of fiber optic true time delay circuits receive an RF signal input from an RF exciter and output an optical signal having a controlled time delay. The optical signal is detected and amplified to provide an RF signal which serves as the transmit carrier signal and the local oscillator for the receive circuit mixers, and thus the appropriate delay is introduced on both transmit and receive.

The transmit signal path in the true time delay phased array described above includes an RF analog signal interface between the true time delay circuits and the transmit/receive modules. In the receive signal path, however, a multiplexed digital signal resulting from the analog to digital conversion and time delay of the signals received by the in-phase and quadrature mixers is transmitted across a fiber optic cable from the transmit/receive module to the radar processor. The control signal interface between the transmit/receive module and the radar processor is also digital.

A digital interface would also be desirable in the transmit signal path. All RF signals could then be confined to a limited area near the radiating elements, while all signal reference, processing and control circuitry could be remotely located. An entirely digital interface would provide numerous advantages including the ability to support wider instantaneous bandwidth signals, increased tolerance to alignment errors, reduced reliance on calibration, reduced RF interface signal loss and mismatch problems, simplified manufacturing and integration, increased design flexibility, low cross-talk and resistance to electromagnetic interference. In addition an all digital transmit and receive interface would permit the use of self-contained subarrays of transmit/receive modules, resulting in significant structural improvements in the RF hardware, such as size and weight reductions. Attaining the above advantages will permit more widespread use of phased arrays in size and weight sensitive applications such as aircraft skins, missiles, spacecraft and automobiles. Significant cost savings would also be possible in other traditional phased array applications, such as ship or ground-based radars.

However, there is no true time delay phased array presently available which incorporates a digital interface in both the transmit and receive signal paths. It is therefore not possible to obtain the above advantages using current technology. Although the phased array described above utilizes fiber optic cables to interface the true time delay circuits to the array modules in the transmit path, these cables carry analog signals and therefore many of the problems associated with other types of analog interfaces remain.

It is therefore an object of the present invention to provide a true time delay photonically beamsteered phased array which incorporates a digital interface in the transmit signal path as well as the receive and control signal paths, and which provides the advantages discussed above.

SUMMARY OF THE INVENTION

The present invention provides a true time delay optoelectronically beamsteered phased array which includes a digital interface in the transmit signal path. The phased array radar system of the present invention comprises signal processing means, display means and a plurality of subarrays, each subarray containing a plurality of transmit/receive modules. A reference signal source supplies a digital reference via an optical propagating means to each of the subarrays. Within each subarray, an RF carrier signal is generated in response to and phase coherent with the digital reference signal; a fiber optic true time delay circuit applies an appropriate phase delay to the RF carrier and an appropriate time delay to the modulation signal from the signal processing means; and the modulating signal is modulated onto the RF carrier to provide a transmit signal which is supplied via switching means to the radiating element of each transmit/receive module within the subarray. When a signal is received by the radiating element, it is supplied via the switching means to a receive signal processing means which demodulates and digitizes the received signal using the phased delayed RF carrier as a local oscillator and a time delayed clock in the digitizer. The digitized receive signal is then propagated to the signal processing means.

In accordance with one aspect of the present invention, the digital interface in the transmit path includes a crystal oscillator reference which may be remotely located from the subarray. The crystal oscillator provides a digital reference signal to the subarray over an optical media such as fiber optic cable. Within the subarray the reference signal is supplied to a digital synthesizer which produces an RF signal phase locked to the reference oscillator. The RF signal drives an optoelectronic true time delay circuit. The modulation signal is also supplied over fiber optic cable from the radar processor to the subarray in the form of a digital pulse signal. The modulation signal is also appropriately delayed in the true time delay circuit. A phase-locked loop in the subarray locks the RF carrier signal before it is supplied to the waveform modulator, in which the delayed modulation signal is modulated onto the delayed RF carrier signal to produce the transmit signal.

In accordance with another aspect of the present invention, the digital interface on the transmit path can be directly between individual transmit/receive modules and the digital reference source, rather than between the subarrays and the reference source. Each transmit/receive module would then be capable of converting a digital input to an appropriate RF transmit signal. The transmit/receive module interface could then be made entirely digital by incorporating into each module the subarray hardware for converting a received signal to a suitable digital output.

As a feature of the present invention, an entirely digital interface between the subarray RF circuitry and the reference oscillator can now be provided on both transmit and receive as well as control signal paths. The digital interface improves the flexibility and performance of the phased array, while reducing its complexity. It is now possible to use an efficient modular design approach since the subarray RF circuitry is entirely self-contained and needs only a simple digital interface to the rest of the phased array circuitry.

As an additional feature of the present invention, the digital interface significantly improves the alignment and calibration fault tolerance of the phased array. It is no longer necessary to painstakingly align and calibrate the interface to minimize analog signal losses which detract from phased array performance. This results in a considerable time and cost savings in manufacturing, integration and test.

The above-discussed advantages and features of the present invention will become better understood by reference to the following detailed description of the disclosure and the accompanying drawings.

DETAILED DESCRIPTION OF THE PREFERRED EMBODIMENTS

The present invention provides a phased array having a plurality of subarrays in which a digital interface with the radar processing electronics is used in both the transmit and receive signal paths. A phased array having a digital subarray interface in the receive signal path is disclosed in U.S. Pat. No. 5,051,754, the contents of which are hereby incorporated by reference. The present invention provides a digital subarray interface in both transmit and receive signal paths such that the RF electronics of the phased array are confined to the limited area of the subarray or the transmit/receive module.

Figure 1:
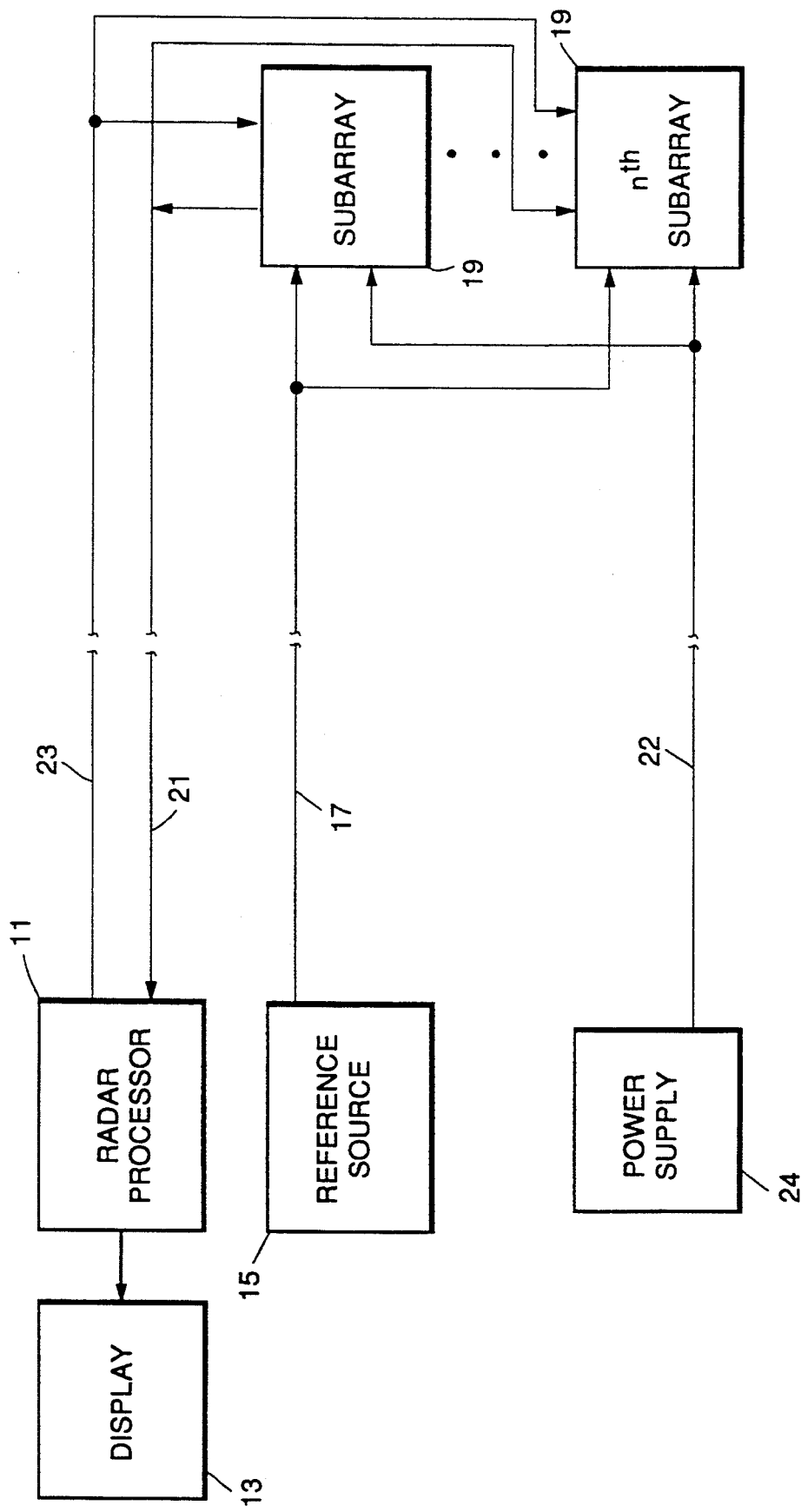
FIG. 1 is a block diagram of a photonically beam-steered phased array in accordance with the present invention.

An exemplary phased array system 10 in accordance with the present invention is shown in FIG. 1. The system 10 includes a radar processor 11 and a radar display 13 responsive to the radar processor 11. The system also includes a reference oscillator 15. The reference oscillator 15 provides a digital reference signal over fiber optic cables 17 to each of the subarrays 19 of the phased array 10. The digital reference signal acts as a master clock for the subarrays 19. The reference source could be any digital reference signal generating means having the stability and noise performance required in modern day Doppler radars. In general, a crystal oscillator is preferred since it exhibits a high stability. Alternative reference oscillators include surface acoustic wave (SAW) oscillators, dielectric resonator oscillators (DROs) and sapphire ring oscillators.

Other alternative reference signal generating means could also be used. For example, a bank of several crystal oscillators or the harmonics thereof could provide the reference directly or could be mixed to provide selectable reference signals at a variety of different frequencies. When the frequencies are selected correctly a digital synthesized tunable reference is produced. Another alternative reference signal generating means could involve the use of direct digital synthesis in which a reference signal is provided to an analog to digital convertor to obtain digital words representing the signal. The digital word is then supplied to an analog to digital convertor whose output is a sinusoid at the desired reference frequency. The signal can be squared via amplification to produce a digital reference signal, or the zero crossings of the analog signal could be detected to provide a stable reference. Yet another alternative reference signal generating means could include two stable laser sources which are mixed in a photodetector to produce a stable low frequency reference.

It should also be understood that signal propagating means such as fiber optic cables 17 could be replaced by a variety of alternatives, including low loss electrical cables. Optical interfaces are preferred due to their light weight, low cross-talk, small size and resistance to electromagnetic interference. Alternate optical propagating means include polymers, free space or holographic optical propagation. It would also be possible to combine the transmit, receive and control fiber optic cables into a single photonic interface through the use of wavelength division multiplexing.

Respective fiber optic cables 21 are utilized for communicating multiplexed control signals from the radar processor 11 to the subarrays 19, and respective fiber optic cables 23 are utilized to communicate received digitized received signals from the subarrays 19 to the radar processor 11. Fiber optic cable connections are thus used for all connections between the radar processor and reference and the subarray 19. The only non-photonic connections which have to be made are RF connections between the transmit/receive modules within subarray 19 and their respective radiating elements, and DC power supply connections. It should be noted that all of these fiber optic cables are carrying only digital signals, and thus represent a digital interface in the transmit, receive and control signal paths. The fiber optic cables for transmit, receive and control comprise a photonic grid which provides all digital manifolding to each subarray 19. Thus, there is no RF analog signal manifold between subarrays.

A dc voltage power supply 24 supplies a single high voltage low current input to each subarray 19 of the phased array 10 via a grid of interconnections. Each subarray 19 contains a high efficiency resonant power supply 25 to provide the proper voltages for the subarray and the transmit/receive modules contained therein. The subarray resonant power supply operates off the high voltage low current input from phased array power supply 24.

The radar processor 11, display 13, reference signal source 15 and power supply 24 of the phased array can be remotely located from the plurality of subarrays 19. Each of the subarrays contains common RF transmit and receive subarray circuitry, as well as a number of transmit/receive modules. Each of the transmit/receive modules includes a radiating element. The phased array can therefore be viewed as an n by m array of radiating elements in which each of n subarrays 19 incorporates m radiating elements. The subarrays 19 are interconnected via the photonic manifold consisting of fiber optic cables 17, 21 and 23. The photonic manifold allows for efficient communication within the entire array while maximizing alignment and calibration tolerances at each point of interconnection between the manifold and the subarrays.

Figure 2:
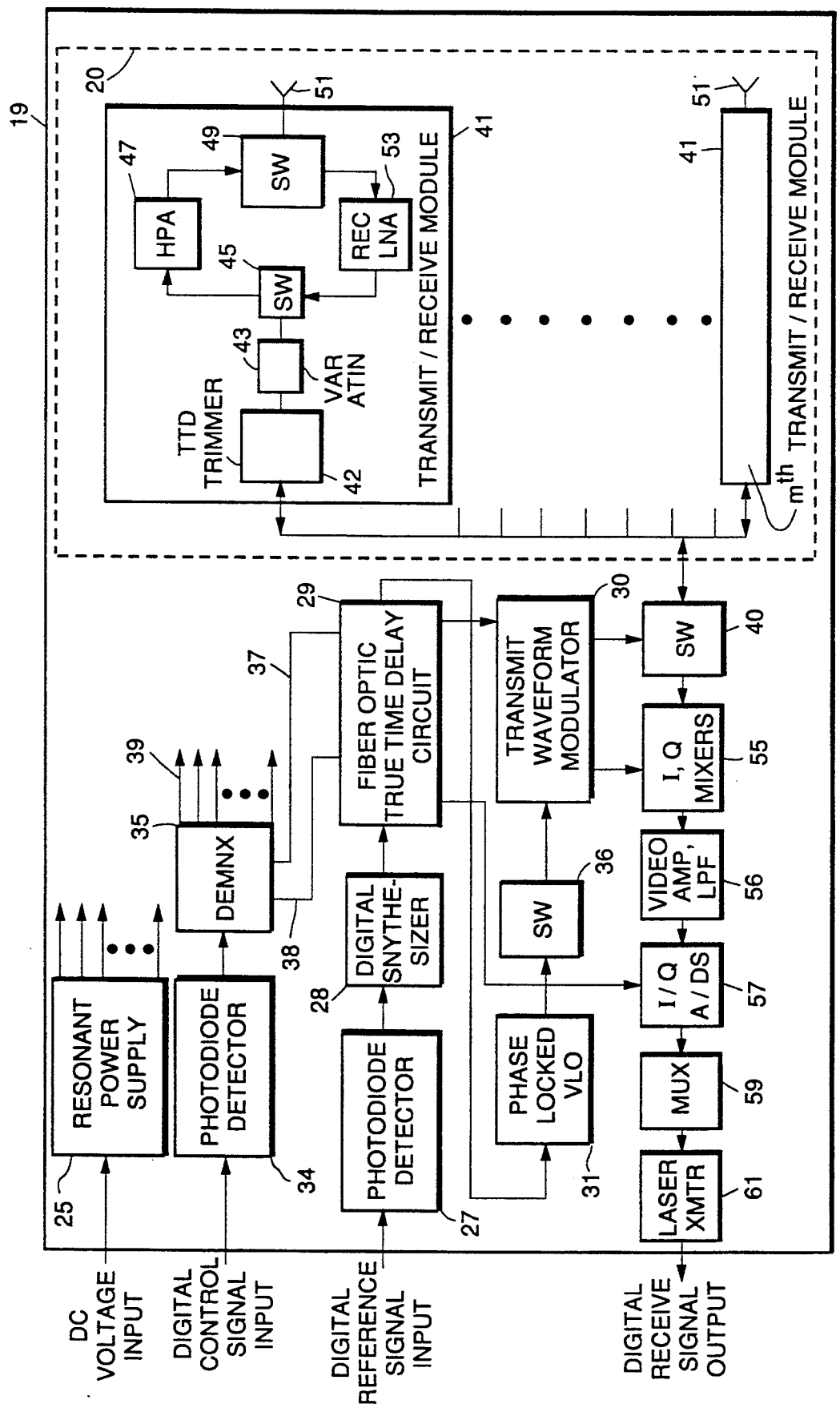
FIG. 2 is a block diagram of one of the subarrays of the phased array of FIG. 1 showing an exemplary preferred embodiment of the digital subarray interface in the transmit signal path.

A block diagram of an exemplary subarray 19 is shown in FIG. 2. The exemplary subarray 19 includes a group 26 of m transmit/receive modules 41 which transmit and receive modulated RF radar signals via radiating elements 51. In the transmit signal path, each subarray 19 includes a photodetector 27, a digital synthesizer 28, an optoelectronic true time delay circuit 29, a VCO and phase locked loop 31, a modulation waveform generator 33, and a waveform modulator 30. An RF switch 36 is used to supply the delayed RF carrier signal from true time delay circuit 29 to the receive signal path within the subarray where it functions as a local oscillator signal.

The operation of the transmit signal path hardware in an exemplary subarray 19 is as follows. The digital reference signal generated within oscillator 15 is supplied to photodetector 27 via one of the fiber optic cables 17. Photodetector 27 converts the optical digital signal to an electrical digital signal. Digital synthesizer 28 generates a relatively low frequency RF signal phase coherent with the digital reference signal. The synthesizer 28 typically has an output RF frequency range of about 200 to 400 MHz. Alternative RF carrier signal generating means include step recovery diodes or other devices capable of generating a series of phase coherent harmonics from an applied digital signal. The low frequency RF output of synthesizer 28 is applied to the optoelectronic true time delay circuit 29, which produces the appropriate phase for a particular subarray transmit signal. The same true time delay circuit 29 is preferably used to provide appropriate time delay for the transmit modulation signal as well as the receive A/D convertor clocks. This technique utilizes the fact that under the principle of superposition a time delay may be separately introduced into the individual carrier and modulation components of a modulated carrier signal before they are combined. True time delay beamsteering is used within the subarray to provide wide instantaneous bandwidth operation and wide beam pointing scan angles for both large and small arrays. Further details regarding optoelectronic true time delay circuits can be found in U.S. Pat. No. 5,051,754, incorporated herein by reference.

The delayed RF signal from synthesizer 28 is then applied to a VCO 31 which includes a phase-locked loop. VCO 31 phase locks to a higher frequency harmonic of the synthesized RF signal to provide an RF carrier signal which is phase coherent with the digital reference. The VCO output is generally a higher frequency signal and the characteristics of the VCO can be altered to provide a wide range of carrier signal frequencies. The RF carrier signal can have a frequency anywhere from below 10 MHz to greater than 100 GHz in the wide instantaneous bandwidth system of the present invention. The delayed RF carrier signal also serves as the local oscillator for mixing the received RF signal to baseband as will be discussed in greater detail below. Alternative RF carrier signal generation means, including but not limited to multiplier chains, could also be used, as long as the correct phase supplied by the true time delay circuit is maintained. The RF carrier on transmit and local oscillator on receive have appropriate phase delay as set by true time delay circuit 29, but the time delay required to operate the phased array as a true time delay system is supplied by introducing an appropriate time delay into the transmit modulation waveform and the receive A/D convertor clocks.

The transmit modulation waveform is multiplexed with other digital control signals in radar processor 11 and supplied to subarrays 19 via fiber optic cable 21. The digital control signals are converted from optical to electrical signals in photodetector 34 and then demultiplexed in demux 35. Demux 35 supplies transmit modulation waveform and receive A/D convertor clocks to true time delay circuit 29 via lines 37 and 38 respectively. Other control signals are provided to the appropriate switching circuitry via lines 39. True time delay circuit 29 delays the transmit modulation waveform and the receive A/D clocks by an amount suitable to provide a desired effective beam pointing direction for the phased array. The delayed transmit modulation waveform is supplied to transmit waveform modulator 30. The transmit modulation waveform or envelope is typically a train of pulses, each of a particular time duration. In the wide instantaneous bandwidth phased array of the present invention the pulses can have a pulsewidth of less than 1.0 nsec to greater than 10.0 nsec, equivalent to an instantaneous bandwidth of greater than 1.0 GHz to less than 100 MHz, respectively. The pulse train is modulated onto the RF carrier signal supplied to modulator 30 from phase-locked VCO 31 via switch 36 to provide a modulated RF transmit signal. The pulse train modulation waveform supplied over line 37 is delayed in the fiber optic true time delay circuit 29 and supplied to the transmit waveform modulator 30. It should be noted that other forms of envelope modulation could be used and delayed in the same manner. Examples of alternative modulation waveforms include pulse compression waveforms and frequency ramped waveforms that generate spread spectrum wide instantaneous bandwidth signals. These alternative signals would also use the combination of supplying the correct phase for the RF carrier via the true time delay circuit 29 and the correct modulation envelope delay as described above to achieve true time delay beamsteering on transmit.

The RF transmit signal is supplied via switch 40 to each of the n modules 41 in the group 26 of transmit/receive modules of the particular subarray 19. Within each transmit/receive module 41 there is a true time delay trimmer phase shifter 42 which permits phase adjustments for each individual module as needed. This trimmer can be a true time delay variable length transmission line. Further details regarding the trimmer can be found in U.S. Pat. No. 5,014,023, which is incorporated herein by reference.

The transmit signal amplitude is then adjusted in variable attenuator 43 and supplied via switch 45 to high power amplifier 47. The amplified transmit signal is then supplied via transmit/receive switch and circulator 49 to wideband radiating element 51. The transmit signals generated by the n by m array of wideband radiating elements together provide the desired beam pointing direction for the phased array.

In the receive signal path a digital subarray interface is provided as disclosed in U.S. Pat. No. 5,051,754. A modulated RF carrier signal is received via wideband radiating element 51 and directed via transmit/receive switch and circulator 49 to a low noise amplifier 53. The amplified signal is then is supplied to variable attenuator 43 and true time delay phase trimmer 41 which can adjust the amplitude and phase, respectively, of the received signal. Switch 40 is then configured to provide the received signal to in-phase and quadrature mixers 55. The delayed local oscillator signal generated as described above is provided via switch 36 to mixers 55 which demodulate the received RF signal to recover the baseband modulation signal.

It should be noted that the mixing process produces the conjugate of the appropriate phase as a result of the negative sign in the difference signal generated when the local oscillator is mixed with the received signal. The conjugate of the transmit carrier signal phase should therefore be used for the local oscillators on receive. The conjugate of a given phase is defined as the difference between the given phase and 360°. The conjugate of the transmit carrier signal phase can be provided by switching the bit setting of the true time delay circuit during receive. In a true time delay circuit in which y of x bits are used to steer on transmit, the conjugate phase is produced on receive by using x-y bits. As an alternative, separate true time delay circuits could be used for transmit and receive. There is no sign reversal problem for the true time delay introduced in the modulation waveform and the A/D clocks. In the digital transmit signal path, the correct transmit phase is generated by locking on a harmonic of the a true time delayed reference signal. This should be distinguished from the mixing used in the received signal path where the conjugate phase occurs in using the mixed difference signal.

The baseband modulation signal is then amplified and low-pass filtered in baseband processing circuitry 56. A/D converters 57 digitize the amplified and filtered in-phase and quadrature components of the received modulation signal. The digitized in-phase and quadrature components are then multiplexed in multiplexor 59 and converted to optical digital signals in laser transmitter 61 and supplied over fiber optic cable 21 to radar processor 11. A digital receive signal interface between subarray 19 and the radar processor 11 is thus provided.

As an alternative embodiment, the RF hardware common to each of the m transmit/receive modules within the subarray could be placed within each transmit/receive module to further reduce the number and length of RF interconnections. The advantages of reduced RF path length, transmit/receive module flexibility and overall reliability is achieved at the cost of providing the additional hardware within each transmit/receive module. For certain types of arrays such an arrangement might be advantageous. These include arrays with carrier frequencies of less than about 1.0 or 2.0 GHz, in which the transmit/receive modules are larger in size.

In another alternative embodiment the digital synthesizer 28 and fiber optic true time delay circuit 29 could be remotely located with the reference source 15. The digital signals out of the true time delay circuit 29 could be sent up to the subarray 19 over a fiber optic cable. In a typical application, the subarrays are phased in a pattern such that one is steered with the conjugate time delay of another subarray. The off subarray location of the digital synthesizer 28 and fiber optic true time delay circuit 29 thus makes it possible to use one for getting the conjugate phase for the local oscillator signal and the other for delaying the analog to digital convertor clocks. It would therefore be unnecessary to switch any true time delay unit between transmit and receive.

It should also be noted that the use of an all optical time delay unit permits wavelength multiplexing to delay both the RF signal and clocks using the same time delay unit without any signal interaction.

Although the foregoing has been a description and illustration of specific embodiments of the invention, various modifications and changes thereto can be made by persons skilled in the art without departing from the scope and spirit of the invention as defined by the following claims.

What is claimed is:

1. A phased array radar system comprising:

signal processing means for providing and processing control, modulation and clocking signals for said phased array radar system;

display means for displaying a representation of one or more of said signals as processed by said signal processing means;

a plurality of subarrays, each of said subarrays having a plurality of transmit/receive modules, each of said transmit/receive modules having at least one radiating element;

reference signal generating means for generating a digital reference signal for each of said subarrays;

reference signal propagating means for propagating said digital signal from said reference signal generating means to each of said subarrays such that said subarrays have a digital interface with said reference signal generating means;

RF carrier signal generating means within each of said subarrays for generating an RF carrier signal in response to said digital reference signal, said RF carrier signal having a phase coherency with said digital reference signal;

fiber optic true time delay circuit means within each of said subarrays for providing an appropriate phase delay to said RF carrier signal, said fiber optic true time delay circuit means further providing an appropriate time delay to said modulation and clocking signals provided by said signal processing means;

transmit waveform modulators within each of said subarrays for modulating said modulation signal from each of said true time delay circuit means onto said RF carrier signal to provide modulated transmit signals;

switching means within each of said subarrays for providing said transmit signal from said transmit waveform modulator to each of said transmit/receive modules within said subarray such that said transmit signal is radiated from said radiating element within said transmit/receive module;

receive signal processing means within each of said subarrays for receiving and demodulating receive signals received by said radiating element of each of said transmit/receive modules to produce baseband signals, said receive signal processing means further processing said baseband signals in accordance with said clocking signals from said true time delay circuits to provide digitized baseband signals;

receive signal propagating means for propagating said digitized baseband signals from each of said subarrays to said signal processing means such that said subarrays have a digital interface with said signal processing means; and dc power supply means for providing dc voltage to each of said subarrays, said signal processor and said display.

2. The phased array of claim 1 wherein said reference signal generating means comprises a crystal oscillator.

3. The phased array of claim 1 wherein said reference signal propagating means and said receive signal propagating means comprise fiber optic cable.

4. The phased array of claim 1 wherein said RF carrier generating means comprises:
   a digital synthesizer providing an RF signal phase coherent with said reference signal and having a plurality of harmonics; and
   a phase-locked VCO for producing an RF carrier signal phase locked to one of said harmonics of said RF signal from said digital synthesizer.

5. The phased array of claim 4 wherein said fiber optic true time delay circuit provides an appropriate phase delay to said RF signal from said digital synthesizer and an appropriate time delay to said modulation signal before said RF signal is applied to said phase-locked VCO.

6. The phased array of claim 1 wherein said RF carrier signal from said RF carrier signal generating means within each subarray also serves as a local oscillator in said receive signal processing means for demodulating said receive signals from said transmit/receive modules within said subarray.

7. In a phased array radar system having a signal processing means, display means and a pluality of subarrays, a transmit signal path digital interface comprising:
   digital reference signal generating means for generating a digital reference signal for each of said subarrays;
   reference signal propagating menas for propagating said ditial reference signal from said reference signal generating means to each of said subarrays;
   RF carrier signal generation means within each of said subarrays for generating an RF carrier signal in response to said digital reference signal, said RF signal having a phase coherency with said digital reference signal;
   fiber optic true time delay circuit means within each of said subarrays for applying to said RF carrier signal a controlled phase delay relative to the outputs of true time delay circuit means in other subarrays, and for applying to a modulation signal provided by said signal processing means a controlled time delay relative to the outputs of true time delay circuits in other subarrays;
   transmit waveform modulator means in each of said subarrays for modulating said modulation signal from said fiber optic true time delay circuit means onto said RF carrier singnal to provide modulated transmit signals for supplying to one or more radiating elements within each of said subarrays; and dc power supply means for providing dc voltage to each of said arrays, said signal processor means, and said display means.

8. The digital transmit signal path interface of claim 7 wherein said digital reference signal generation means comprises a crystal oscillator.

9. The digital transmit signal path interface of claim 7 wherein said propagating means comprise fiber optic cable.

10. The digital transmit signal path interface of claim 7 wherein said RF carrier signal generating means comprises:
    a digital synthesizer providing an RF signal phase coherent with said reference signal and having a plurality of harmonics; and
    a phase-locked VCO for producing an RF carrier signal phase locked to one of said harmonics of said RF signal from said digital synthesizer.

11. The digital transmit signal interface of claim 7 wherein said fiber optic true time delay circuit provides an appropriate phase delay to said RF signal from said digital synthesizer and an appropriate time delay to said modulation signal before said RF signal is applied to said phase-locked VCO.

12. A phased array radar system comprising:
    signal processing means;
    display means;
    a plurality of subarrays;
    digital crystal oscillator reference signal generating means for generating a digital reference signal for each of said subarrays;
    RF carrier signal generation means for generating an RF carrier signal in response to said digital reference signal, said RF carrier signal having a phase coherency with said digital reference signal;
    fiber optic true time delay circuit means for applying to said RF carrier signal a controlled phase delay, and for applying to a modulation signal provided by said signal processing means a controlled time delay; and
    transmit waveform modulator means for modulating said modulation signal from said fiber optic true time delay circuit means onto said RF carrier signal to provide modulated transmit signals for supplying to one or more radiating elements within each of said subarrays.

13. The phased array of claim 12 wherein said RF carrier signal generating means comprises:
    a digital synthesizer providing an RF signal phase coherent with said reference signal and having a plurality of harmonics; and
    a phase-locked VCO for producing an RF carrier signal phase locked to one of said harmonics of said RF signal from said digital synthesizer.

14. The phased array of claim 12 wherein said fiber optic true time delay circuit provides an appropriate phase delay to said RF signal from said digital synthesizer and an appropriate time delay to said modulation signal before said RF signal is applied to said phase-locked VCO.

* * * * *